Feb. 21, 1939.  A. W. BAUMANN  2,147,876
COUNTERCURRENT CONDENSER
Filed Aug. 14, 1937
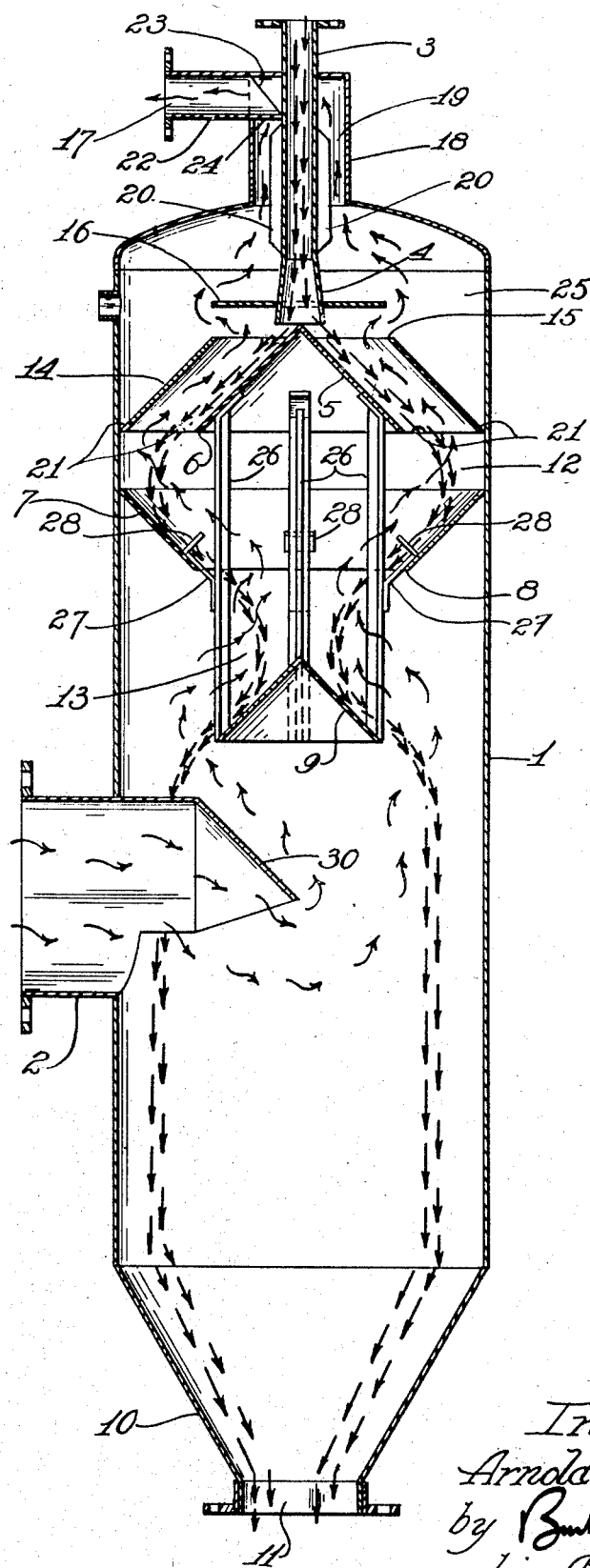
Inventor
Arnold W. Baumann
by his Attorneys.

Patented Feb. 21, 1939

2,147,876

UNITED STATES PATENT OFFICE 2,147,876

COUNTERCURRENT CONDENSER

Arnold W. Baumann, Chicago, Ill.

Application August 14, 1937, Serial No. 159,064

6 Claims. (Cl. 261—108)

This invention relates to condensers of the counter-current type, in which the vapor to be condensed is passed in direct contact with the cooling fluid, and its object is to increase the efficiency of such apparatus by various changes in the parts and in their relative arrangement, without adding materially to the cost of manufacture. It consists of certain features and elements of construction herein shown and described, as indicated by the claims.

The drawing illustrates a condenser embodying this invention, showing the structure in vertical section, taken substantially along the axis of the cylindrical shell.

The main body or shell 1 of the condenser unit is shown as of substantially cylindrical form, mounted with its axis vertical, and provided with a lateral inlet connection 2, through which the vapors to be condensed are introduced into the lower portion of the shell 1. Apparatus of this type is adapted for use in connection with a milk evaporating plant, and such use will be assumed in connection with the following description, though it may be understood that the apparatus is equally well adapted to various other processes. At the upper end of the shell 1 there is shown the water inlet pipe 3 having a slightly flared terminal 4 within the shell; through this terminal the cooling water is released onto a conical spreader 5 over which it flows for discharge outwardly and downwardly from the lower edge 6 of the cone 5. Spaced below said edge of the spreader 5 is an oppositely inclined conical member 7 which receives the water falling from the cone 5 and directs it convergently toward the axis of the shell 1. The member 7 is a truncated cone, so that the water is discharged downwardly and inwardly from its lower annular edge 8 onto a second conical spreader 9 spaced below the discharge edge of the member 7. This again directs the flow outwardly and downwardly for final discharge into the lower portion of the shell 1, which includes a tapering terminal 10 leading to a flanged outlet connection 11.

It may be understood that the interior of the shell 1 is subjected to a suction or partial vacuum produced by a vacuum pump or equivalent apparatus, not shown, and acting through an exhaust port located in the top of the shell. The vapors resulting from the evaporating process and entering the shell at the inlet 2 are mixed with a considerable amount of air and some non-condensible gases; and it is the function of the condenser to transform the vapor into liquid, and, at the same time, cool the air and non-condensible gases so as to reduce their volume to a minimum, whereby they may be handled by a relatively small suction apparatus.

The downward flow of water from the inlet pipe 3 to its discharge from the lower edge of the cone 9 is practically unimpeded so that in its fall from the cone 5 through the space 12 and onto the deflecting surface of the member 7, and again in traversing the space 13 between member 7 and the lower cone 8, it forms a curtain of spray through which the incoming vapor from the inlet 2 must pass in its upward course through the shell 1 and by which a considerable portion of this vapor will be condensed and picked up for discharge with the cooling water at the outlet 11. The air and non-condensible gases, together with any vapor which remains uncondensed after passing through the water flow at 13, and then at 12, travel upwardly under the guidance of a conical baffle 14, which trends inwardly at substantially the same angle as the spreader cone 5. This directs the vapor and gases into contact with the water flowing downwardly over the spreader 5 whereby the vapor is condensed and the air and gases are cooled, so that their volume is reduced in this portion of their upward travel.

A short distance above the upper edge 15 of the baffle 14 I provide a second baffle 16, which is shown as a substantially flat, circular disk carried by the flaring portion 4 of the water inlet pipe 3. Above the shell 1 an outlet conduit 17 is connected to the source of suction, not shown, and communicates with the interior of the shell 1 by way of a centrally mounted cylindrical dome 18, which is co-axial with the shell 1. As shown, the water inlet pipe 3 is axially mounted within the dome 18, so that the latter affords an annular exhaust passage leading from the top of the shell and symmetrically located with respect to the baffles 14 and 16 which control the flow of air and non-condensible gases toward the annular space 19 within the dome 18. The partial vacuum thus produced within the upper portion of the shell 1 will draw air and other gases laterally along the under side of the baffle 16 and thence upwardly around its outer edge into the dome 18. The gases, upon escaping past the edge 15 of the baffle 14, are thus released into a relatively large space 25 in the upper portion of the shell 1. This results in a considerable reduction of velocity in this larger space, affording an opportunity for precipitation of any water which may have been picked up and entrained in the gases during their counter-current flow upwardly in the condenser, and particularly between the spreader 5 and the baffle 14. Any water thus precipitated in the space 25 will tend to accumulate on the outer face of the baffle 14, and then flow downwardly by gravity into the angular channel formed between the lower edge of the baffle 14 and the cylindrical wall of the shell 1; therefore, drain ports 21 may be provided in this lower edge of the baffle 14 to release, such liquid into the lower portion of the condenser shell for discharge at the outlet 11.

By virtue of the counter-current principle, the coldest water in the condenser is that which enters through the pipe 3; hence, it will be quite effective in chilling the annular space 19 between the wall of the dome 18 and the water inlet pipe 3, with the result that a final cooling of the air and non-condensible gases will take place in this space. To even further increase the efficiency at this point, the inlet pipe 3 may be provided with radially projecting fins 20 for absorbing heat from the gases and transferring it to the cooling water. Thus the volume of the air and other non-condensible gases drawn off through the outlet 17 is reduced to a minimum so as to require such an apparatus of relatively small volumetric capacity. An outstanding feature of this invention is the central or axial location of the exhaust dome 18 with respect to the cylindrical shell 1 and the symmetrical relation of the exhaust passage to the baffles which control the flow of vapor and gases upwardly to this outlet. This centralized location of the exhaust port results in an evenly effective suction at all sides of the axis of the shell 1, thus tending to utilize all parts of the passages to their full capacity, and disposing of a large quantity of vapor and other gases thoroughly and expeditiously. The arrangement of baffles and spreaders within the cylindrical shell 1 provides for directing the vapor and gaseous flow over the water surface in counter-current relation, and actually requires the vapor to pass through screens or curtains of water at certain points, thus insuring condensation of the vapor and cooling of the gases; but the high efficiency of the apparatus is realized by virtue of the centralized location of the exhaust port in the dome 18. As seen in the drawing, the vacuum connection at 17 is afforded by a pipe 22, which enters the dome 18 at one side; the inner end of the pipe 22 is cut off obliquely at 23, and this portion protrudes into the duct so that the longer side of the pipe 24 is exposed downwardly and extends to the axially disposed water inlet pipe 3. This arrangement tends to equalize the suction effect at all sides of the dome, while the central location of the latter insures equal distribution of the suction throughout the upper portion of the shell 1.

As shown in the drawing, the lower spreader cone 9 is connected to the upper cone 5 by vertically extending bars 26, and these bars are connected to the truncated conical member 7 by clips 27. Preferably, these clips terminate in the small baffles 28 upstanding from the inner surface of the member 7 and serving to deflect the flow of water over this surface to form openings in the cascade or curtain flowing from the lower edge 8 of the member 7. This permits the vapor and non-condensible gases to pass upwardly through the water, and serves to equalize the pressure as between the upper and lower parts of the condenser shell 1. And to prevent the downpour of water from the cone 9 from unduly deflecting the incoming stream of vapor at the inlet 2, the inlet connection includes a hood 30 protruded into the shell 1, substantially to the central axis, so that the vapor emerges from under this hood, inside the cylindrical envelope of water falling through the lower portion of the condenser. While there is shown and described herein certain specific structure embodying the invention, it will be manifest to those skilled in the art that various modifications and rearrangements of the parts may be made without departing from the spirit and scope of the invention, and that the same is not limited to the particular form herein shown and described, except in so far as indicated by the appended claims.

I claim:

1. A counter-current condenser including an upright cylindrical chamber with an inlet for vapor in a lower part, and an axially disposed exhaust conduit opening into the top of said chamber, together with a suction pipe connected laterally into said exhaust conduit and having the under side of its terminal portion extending into the conduit to a point adjacent its axis to effect a uniform suction throughout the conduit.

2. A counter-current condenser including an upright cylindrical chamber with an inlet for vapor in a lower part, an axially disposed exhaust dome at the top of said chamber with an axially located inlet pipe for cooling fluid extending vertically through said dome and into the top of the chamber, whereby the exhaust passage is rendered annular in cross-section, and an exhaust conduit of tubular form entering the dome at one side, said tube terminating inside the dome in an opening in a plane oblique to the axis of the tube with the longer portion of the tubing wall disposed toward the chamber and protruding into the dome substantially to the water inlet pipe to effect uniform suction throughout the annular exhaust passage of the dome.

3. In a counter-current condenser including an upright cylindrical chamber with an inlet for vapor in the lower part and a centrally disposed exhaust port in the top of said chamber, an inlet conduit admitting cooling fluid through the upper part of the chamber, and means guiding the fluid discharged from said conduit downwardly in counter-current relation to the vapor, baffle means directing the flow of vapor and accompanying air and non-condensible gases upwardly in the chamber, said means including a truncated conical baffle extending upwardly and inwardly from the cylindrical wall of the chamber and disposed to release the air and other gases from its upper edge into a relatively large space surrounding the cooling fluid conduit in the top portion of the chamber for retarding their flow, said cooling fluid in the conduit serving to chill said air and gases and precipitate entrained liquid therefrom, and said conical baffle serving to collect the liquid precipitated in said top portion of the chamber, and having a drain port adjacent the wall of the chamber for releasing the liquid into the downwardly flowing current of liquid in a lower portion of said chamber.

4. In a counter-current condenser including an upright cylindrical chamber with an inlet for vapor in the lower part and an exhaust port in the top of said chamber, an inlet conduit extending downwardly through the exhaust port and the upper part of the chamber admitting cooling fluid into the upper part of the chamber for downward flow therethrough, baffle means directing the flow of vapor and accompanying air and non-condensible gases upwardly in the chamber in proximity to the cooling fluid, said means being formed to confine the upwardly flowing gases at a distance from the top of the chamber and adapted to release said gases into a relatively large space adjacent the top, thus retarding their flow to facilitate the chilling of said gases by contact with the cooling fluid conduit and to effect precipitation of liquid previously entrained therein by contact with the cooling fluid.

5. In a counter-current condenser including a chamber with an inlet for vapor in the lower part and an exhaust port in the top, with a suction connection leading therefrom, baffle means directing the flow of vapor and non-condensible gases upwardly in the chamber, an inlet pipe for cooling fluid in the upper part of the chamber extending co-axially in the exhaust port and conveying the fluid in counter-current relation to the gases exhausted through said port, together with fins on the inlet pipe projecting into the exhaust passage and extending longitudinally therein to facilitate the transfer of heat from the non-condensible gases to the cooling fluid for reducing the volume of said gases to a minimum as they leave the condenser.

6. In a counter-current condenser including an upright cylindrical chamber with an inlet for vapor in the lower part and an exhaust port in the top of said chamber, means for directing cooling fluid for downward flow through the chamber, baffle means directing the flow of vapor and accompanying air and non-condensible gas upwardly in the chamber in proximity to the cooling fluid, said means being formed to confine the upwardly flowing gases at a distance from the top of the chamber and adapted to release said gases into a relatively large space adjacent the top, and cooling means disposed in said space, whereby the flow of gases through the large space is retarded and said gases are chilled by contact with the cooling means for effecting precipitation of liquid previously entrained therein by contact with the cooling fluid.

ARNOLD W. BAUMANN.